United States Patent [19]

Butler

[11] 4,000,600
[45] Jan. 4, 1977

[54] COMBINE HEADER WITH BOTTOM SUPPORT BEAM

[75] Inventor: James G. Butler, Islington, Canada

[73] Assignee: Massey-Ferguson Industries Limited, Toronto, Canada

[22] Filed: Apr. 14, 1975

[21] Appl. No.: 568,087

[52] U.S. Cl. .............................................. 56/220
[51] Int. Cl.² ...................................... A01D 47/00
[58] Field of Search ........................ 56/14.3–14.6, 56/192, 208, 219, 220, 221, DIG. 1

[56] References Cited

UNITED STATES PATENTS

| | | | |
|---|---|---|---|
| 3,363,407 | 1/1968 | Drummond | 56/14.4 X |
| 3,451,199 | 6/1969 | Molzahn | 56/14.4 |
| 3,479,805 | 11/1969 | Soteropulos | 56/14.4 X |
| 3,561,198 | 2/1971 | Herbsthofer | 56/14.4 X |

*Primary Examiner*—J.N. Eskovitz
*Attorney, Agent, or Firm*—Robert L. Farris

[57] ABSTRACT

A crop-gathering table for a combine harvester has a tubular main cross beam on which are supported at spaced intervals a plurality of angle iron ribs extending downwardly and then forwardly to support the back wall and then the bottom wall of the table and to support the cutter bar at the front end of the ribs. A stiffener plate is secured to the bottom of the ribs so that with the bottom wall of the table a plurality of hollow cells are formed to provide a rigid but lightweight table structure.

9 Claims, 5 Drawing Figures

COMBINE HEADER WITH BOTTOM SUPPORT BEAM

As manufacturers continue to build increasingly large combine harvesters, the design of suitable crop-gathering tables sufficiently wide to match the crop-gathering capacity of the table with the crop threshing capacity of the combine presents a number of problems. Beam strength and torsional rigidity must be adequate to prevent either temporary or permanent distortions of the table structure caused by ground irregularities. Severe stresses are imposed upon the table when, for example, one end encounters a substantial rise in ground level which is not encountered by the combine drive wheels, or when one of the drive wheels of the combine falls into a hole which had been spanned easily by the table. These distortions cause the auger to rub on the floor of the table producing wear and interferring with a proper performance of the auger in propelling the crop along the table. Extreme irregularities may transfer a major portion of the weight of the whole combine to the table and elevator. If the table is not strong enough to support that weight of the combine, permanent damage to the table and auger may result.

While the table structure must be sufficiently strong to resist these forces, there are practical limitations upon the total weight of the table. If the combine as a whole is too "nose heavy", then the rear steering wheels contact the ground too lightly and steering becomes unreliable. The use of exotic materials more lightweight than steel introduces a serious cost penalty. Thus, the designer is faced with the problem of providing wider tables which demand a higher beam and torsional strength without incurring excessive weight or cost.

It is an object of the present invention to provide an improved crop-gathering table structure of adequate strength for very wide tables and which is relatively lighter in weight and lower in cost than a conventional structure of the same size.

This is accomplished by the provision of a crop table construction for a combine harvester comprising a main horizontal spar at the top rear and extending from side to side, a plurality of ribs attached to the spar and extending downwardly at the rear of the table and thence forwardly at the bottom of the table, a front and top skin attached to the front and top faces of the ribs, a bottom stiffener plate attached to the bottom of the ribs, and end walls connecting the spar, the skin, and the stiffener plate.

IN THE DRAWINGS

Figure 1:
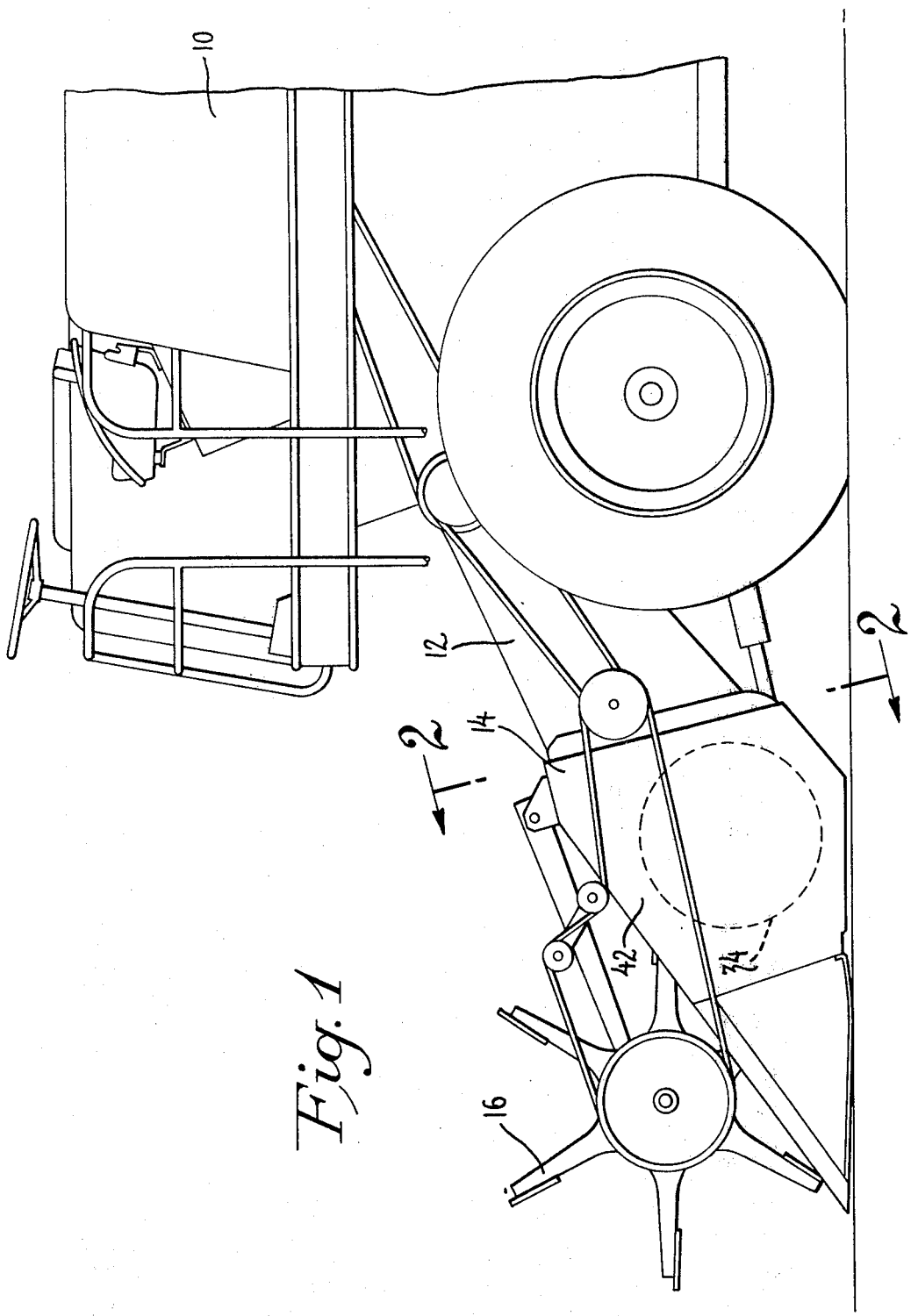
FIG. 1 is a fragmentary side view of a combine incorporating a preferred form of the present invention.
Figure 2:
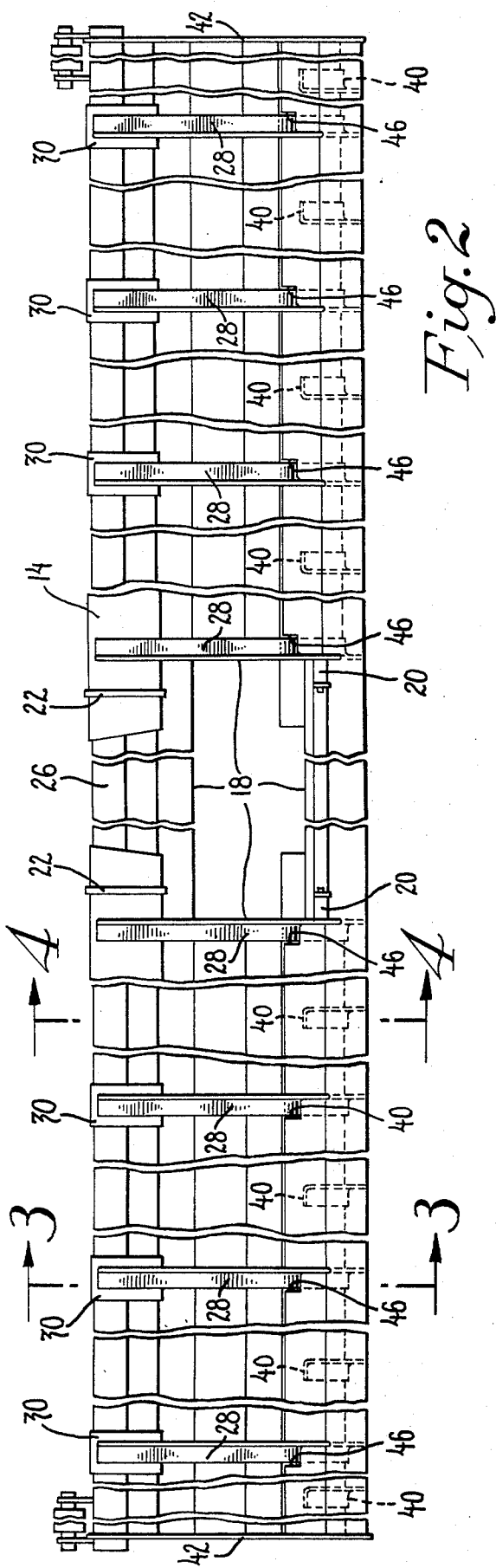
FIG. 2 is a view along line 2 — 2 of FIG. 1.

Referring to FIG. 1, the combine comprises a chassis 10, carrying at its forward end an elevator 12 to which is attached a crop-gathering table 14 which also supports a reel 16. As shown in FIG. 2, the table has a crop transfer opening 18 which connects to the open front end of the elevator 12. Quick-attach means such as the pins 20 and the hooks 22 of usual form may be provided for connecting the table to the elevator.

Figure 3:
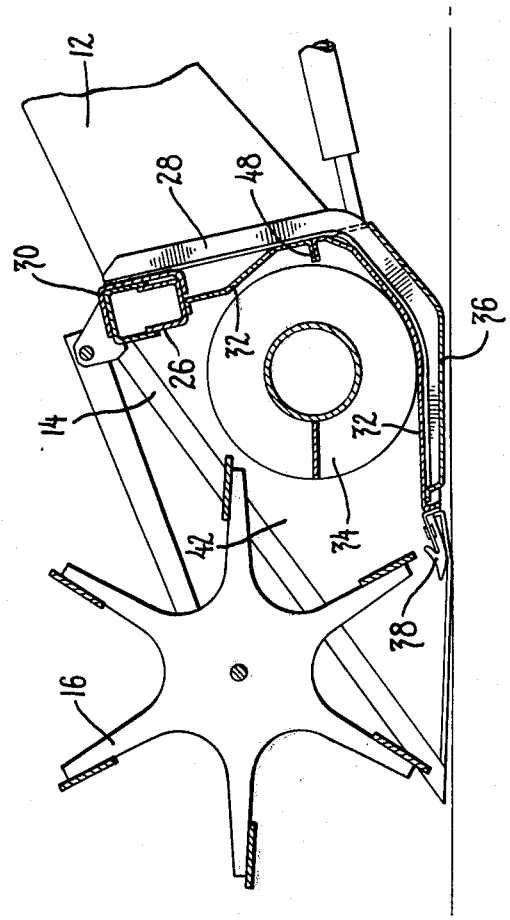
FIG. 3 is a cross-sectional view on line 3 — 3 of FIG. 2.
Figure 4:
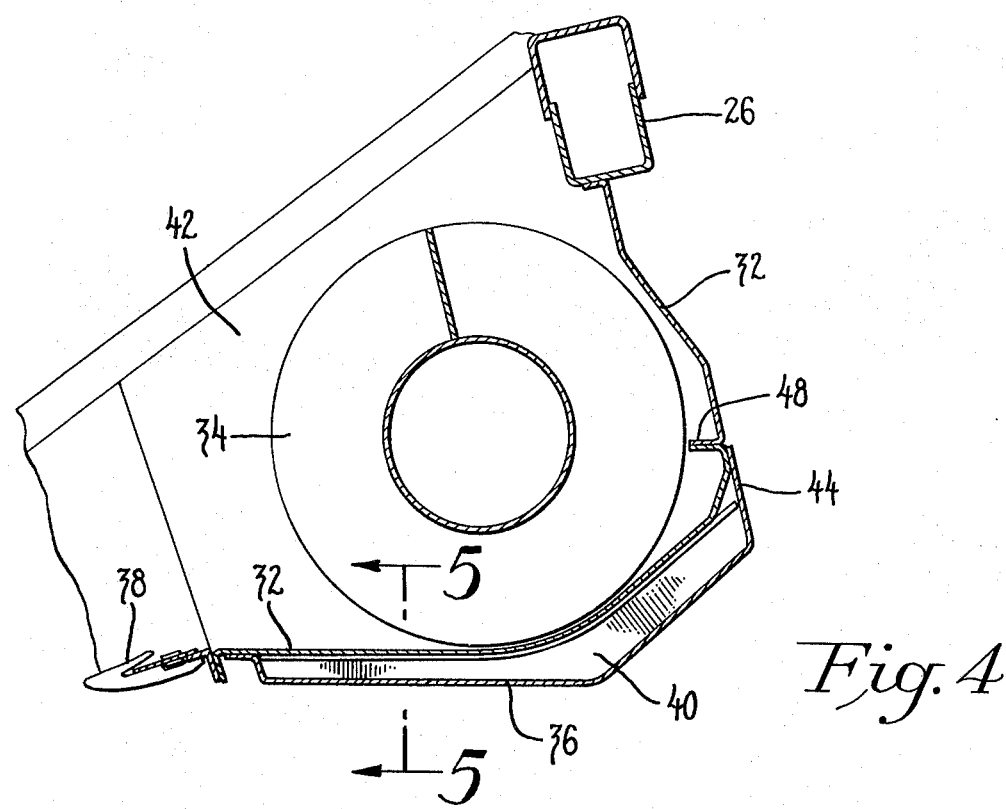
FIG. 4 is a cross-sectional view on line 4 — 4 of FIG. 2.
Figure 5:
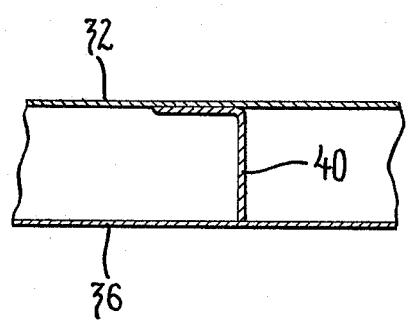
FIG. 5 is a cross-sectional view on line 5 — 5 of FIG. 4.

The table comprises a main spar or beam 26 which extends from end to end of the table and is preferably formed as a rectangular tube. Ribs 28 extend downwardly and thence forwardly at spaced intervals along the width of the table and are secured to the main spar 26 by reinforcing gusset plates 30. The ribs 28 are preferably formed from an angle iron material or they may be of a channel, I beam, T beam, or box tube form if desired. Secured to the forward and top faces of the ribs 28, is a skin 32 (FIG. 3) forming the rear wall and the floor of the table proper along which the usual auger 34 propels the crop toward the center of the table and expels it through the crop transfer opening 18 to the elevator 12 by the usual retractable fingers, not shown. A stiffener plate 36 is secured to the bottom edges of the ribs 28 and at its forward end is secured to the skin 32. The usual knife or cutter bar 38 is supported at the forward edge of the table. Preferably, there are provided intermediate the ribs 28, a series of short ribs 40 (FIG. 4), which are also secured to the skin 32 and the stiffener plate 36. End plates 42 are secured to the main spar 26, the skin 32 and the stiffener plate 36. Preferably, all or most of the securing of the parts of the table together is accomplished by welding. Preferably, also, the stiffener plate 36 is extended at the rear upwardly across the ends of the short ribs 40 as indicated at 44 and is provided with suitable cut outs at 46 to clear the main ribs 28. The back wall of the skin 32 may be provided with an inwardly extended flange 48 serving as a cut off bar to keep the crop from being carried upwardly and to inhibit wrapping of the auger.

By this construction of the table, a high degree of beam strength and torsional resistance is provided. Not only the box beam form of the main spar 26, but also the multi-cellular hollow wall construction provided at the floor of the table together result in a much stronger and lighter table than is possible with conventional table structures. The skin 32 and the stiffener plate 36 in effect form a hollow beam extending the length of the table. The short ribs 40 and the ribs 28 form spacers between the skin 32 and the stiffener plate 36 thereby forming an extremely rigid and lightweight structure.

I claim:

1. A crop table construction for a combine harvester comprising a main horizontal spar at the top rear and extending from side to side, a plurality of ribs attached to the spar and extending downwardly at the rear of the table and thence forwardly at the bottom of the table, a front and top skin attached to the front and top faces of the ribs, a bottom stiffener plate with a front portion attached to the front and top skin, a center portion adjacent to the bottom of the ribs, and a rear portion attached to the front and top skin to form a horizontal hollow tubular beam extending substantially the length of the table, and end walls connecting the spar, the skin, and the stiffener plate.

2. A table construction as defined in claim 1 wherein the ribs have a cross section which includes at least one member extending lengthwise of the table and at least one member extending perpendicular to the first member.

3. A table construction as defined in claim 1 having a plurality of short ribs intermediate the first named ribs and attached to only the skin and the stiffener plate.

4. A table construction as defined in claim 1 wherein the spar is a tubular member.

5. A table construction as defined in claim 1 having a knife support at the front of the table.

6. A crop table construction for a combine harvester comprising a main horizontal spar at the top rear and extending from side to side, a plurality of ribs attached to the spar and extending downwardly at the rear of the table and thence forwardly at the bottom of the table, a front and top skin attached to the front and top faces of the ribs, a bottom stiffener plate attached to the bottom of the ribs, end walls connecting the spar, the skin, and the stiffener plate, and a plurality of short ribs intermediate the first named ribs and attached to only the skin and the stiffener plate.

7. A crop table for a combine harvester characterized by an elongated horizontal hollow tubular beam with a top skin that forms at least part of an auger trough extending substantially the length of said table, a horizontal spar at the top rear of the table, a plurality of ribs interconnecting the hollow beam and the horizontal spar and extending into the horizontal hollow beam, end walls connected to the hollow beam and the horizontal spar and an auger rotatably mounted on the end walls.

8. The crop table for a combine harvester of claim 7 characterized by spacers secured inside the elongated horizontal hollow beam.

9. A crop table for a combine harvester characterized by an elongated horizontal hollow beam with a top skin that forms at least part of an auger trough, a horizontal spar at the top rear of the table, a plurality of ribs interconnecting the hollow beam and the horizontal spar, end walls connected to the hollow beam and the horizontal spar, an auger rotatably mounted on the end walls and spacers secured inside the elongated horizontal hollow beam.

* * * * *